United States Patent [19]

Gardner et al.

[11] Patent Number: 5,154,787
[45] Date of Patent: Oct. 13, 1992

[54] METHOD FOR MAKING CERAMIC COMPOSITE ARTICLE

[75] Inventors: Robert W. Gardner, Big Flats; Constance B. Sawyer, Lindley; Ronald L. Stewart, Big Flats; David S. Weiss, Corning, all of N.Y.

[73] Assignee: Corning Incorporated, Corning, N.Y.

[21] Appl. No.: 607,579

[22] Filed: Nov. 1, 1990

[51] Int. Cl.$^5$ .............................................. B32B 31/00
[52] U.S. Cl. ................................... 156/166; 264/241; 427/375
[58] Field of Search ................ 156/89, 166; 427/375; 264/241, 257, 339, 285

[56] References Cited

U.S. PATENT DOCUMENTS

| | | | |
|---|---|---|---|
| 4,976,761 | 12/1990 | Allaire | 65/3.2 |
| 5,024,978 | 6/1991 | Allaire et al. | 501/95 |

*Primary Examiner*—James Lowe
*Assistant Examiner*—Christopher A. Fiorilla
*Attorney, Agent, or Firm*—Kees van der Sterre

[57] ABSTRACT

Highly uniform prepreg mats comprising inorganic fibers and powered ceramic matrix materials, useful for the manufacture of ceramic matrix composite articles, are provided by a process wherein continuous fiber tows infiltrated with a thermoplastic suspension of the matrix powder are preheated, uniformly collected on a heated drum or other support, and then cooled and compacted with a pressure roller or the like to achieve a prepreg mat structure characterized by a homogeneous distribution of fibers and ceramic matrix material.

6 Claims, 2 Drawing Sheets

METHOD FOR MAKING CERAMIC COMPOSITE ARTICLE

BACKGROUND OF THE INVENTION

The present invention relates to ceramic matrix composites, and to methods for the manufacture thereof. More particularly, the invention relates to an improved method for manufacturing preforms for ceramic matrix composites.

Ceramic matrix composites are well known. Typically they comprise a ceramic matrix material such as a glass, a glass-ceramic, or a crystalline ceramic material forming a matrix wherein refractory inorganic fibers are disposed as a reinforcing phase. A number of U.S. patents show the structure and manufacture of such composites, including, for example, U.S. Pat. Nos. 4,314,852, 4,588,699 and 4,615,987.

In conventional practice, composites incorporating ceramic matrix materials are manufactured from powders of the selected matrix or a matrix precursor, with the fibers being combined with the powders and consolidated to dense composite materials by the application of heat and pressure. The fibers can be short chopped fibers or whiskers, but are more frequently introduced as a continuous fiber strand, consisting of one or more often a multiplicity of fibers in the form of a continuous yarn or tow. To provide a homogeneous distribution of the fibers in the matrix, the powders are generally first dispersed in a liquid vehicle. The resulting suspension is then applied to the fibers by an impregnation or coating process or, in the case of short fibers, by mixing the fibers into the suspension.

After the fibers have been coated or impregnated with the liquid suspension, they are typically laid up into a preform or prepreg comprising the fibers and the suspension containing the powdered material. Frequently, the fiber is provided in the form of a continuous fiber tow, and the prepreg is formed by winding the suspension-impregnated tow onto a rotating support such as a drum.

Using conventional solvent-based liquids as vehicles for the powdered ceramics, the suspensions remain fluid during the fiber impregnation and collection steps, such that desirable integration of the tows being collected occurs. Thus the collected mass of tow becomes a unitary mat. Following collection, the collected material is dried, i.e., the liquid solvents and carriers constituting the vehicle are removed by evaporation, such that an integral dry preform or prepreg which can be conveniently handled is provided.

Referring to specific ceramic suspensions known to the art, U.S. Pat. No. 4,412,854 discloses the manufacture of a fiber-reinforced composite preform from a suspension of a glass powder in a vehicle comprising a thermoplastic polymeric binder, typically an acrylic polymer binder. The binder is dispersed or dissolved in a carrier liquid and powdered matrix material is added. The resulting liquid suspension is combined with a woven or non-woven fiber reinforcement which is then dried and optionally reshaped prior to consolidation.

U.S. Pat. No. 4,588,699 illustrates the use of an aqueous system wherein latex is employed as a binder, and also a solvent-based system wherein the matrix is simply dispersed in a liquid carrier of propanol.

More complex suspension systems are disclosed in U.S. Pat. No. 4,585,500, wherein a synthetic resin is dispersed in a solvent for the resin prior to the introduction of the powdered matrix material. The system further includes components such as paraffin wax, a plasticizer and a surfactant to act as dispersion and stabilization aids and to impart flexibility to the resulting preform after drying.

A recently developed prepreg fabrication procedure, used with particular advantage for the fabrication of ceramic matrix composites, involves the use of suspensions of powdered ceramic matrix materials in thermoplastic vehicles. These are organic vehicle formulations which are room temperature solids, yet which will melt and flow as liquids at moderately elevated temperatures.

In the preparation of prepreg tows from these materials, suspensions of ceramic matrix powder in the heated, liquified binders are first prepared, and then reinforcing fiber tow is impregnated with the liquified suspensions, typically by immersion of the tow therein. The infiltrated tow is then generally withdrawn from the suspension, quickly cooled to a non-tacky state, and then collected on a revolving drum or spool.

Due to the speed with which prepreg tow comprising only thermoplastic binders will solidify, it has proven difficult to form prepreg mat during the tow collection process. Methods have been developed to form collimated tape from prepreg tow of this type, by reheating and fusing multiple yarn ends into a continuous fused ribbon. However, up to the date of the present invention, hot tow collection schemes and other attempts to continuously produce thick prepreg mat had not been successful.

It is therefore a principal object of the present invention to provide a method for making prepreg mat comprising reinforcing fibers and ceramic matrix material in a thermoplastic binder which provides improved structural homogeneity in the prepreg mat material.

It is a further object of the invention to provide a method for making prepreg mat of homogeneous structure which retains good flexibility and excellent thermal reshaping characteristics, due to the presence of thermoplastic binders therein.

It is a further object of the invention to provide a method for making prepreg mat comprising thermoplastic binder wherein the configuration of the mat can be closely controlled.

It is a further object of the invention to provide apparatus for the fabrication of dense, homogeneous preforms for ceramic matrix composite articles from prepreg fiber tow or other stranded fiber.

Other objects and advantages of the invention will become apparent from the following description thereof.

SUMMARY OF THE INVENTION

In accordance with the present invention, a preform fabrication procedure is provided which results in a preform exhibiting improved homogeneity with respect to fiber distribution in the matrix. In addition, the dimensions of width and thickness for the preform are essentially unlimited.

The invention offers significant advantages over alternative methods for producing ceramic composite preforms or prepregs comprising thermoplastic binders. The homogeneity of the preform, particularly with respect to improvements in the uniformity of fiber distribution in the matrix, is superior to that which we have been able to obtain by conventional tow collection methods. In addition, sheet or mat preforms of substantial thickness, which nevertheless retain flexibility and heat softening characteristics adequate for many preform reshaping needs, are easily obtained.

The method of the present invention utilizes a collection substrate such as a collection drum on which prepreg tow is collected in highly uniform fashion at an elevated temperature, i.e., while the thermoplastic binder in the tow is soft. Most preferably, the heated prepreg tow is provided by tow preheater adapted to preheat the fiber tow or other strand prior to contact between the strand and the substrate, or between the strand and strand material previously collected on the substrate. The preheater permits controlled heating of the strand being collected to insure that the thermoplastic binder is sufficiently softened to fuse to adjoining or underlying strand material during collection, so that improved integration of the strand into the preform is obtained.

Also provided is a collection substrate heater designed to continuously heat the substrate and prepreg strand accumulated thereon. This heater maintains the prepreg strand present on the collection substrate at a temperature such that complete fusion thereof to new strand being collected is assured. Further, fiber realignment and redistribution within the collected fiber-containing material is facilitated.

Finally, means operating cooperatively with the collection drum, for compacting the collected prepreg tow or other strand after it has been collected to provide a uniform accumulation, are provided. The compacting means typically comprise a device such as a cooled compaction roller for applying pressure to the collected strands, thereby to complete the desired redistribution of fibers and ceramic matrix material into a uniform, homogeneous prepreg layup.

Viewed in broad aspect, then, the invention first includes a method for the fabrication of a preform for a ceramic matrix composite article which comprises the initial step of providing a continuous heated prepreg strand formed of one or more inorganic reinforcing fibers coated or impregnated with a thermoplastic suspension of a ceramic matrix powder in a thermoplastic binder. The strand is sufficiently heated to soften the thermoplastic suspension thereon.

The heated strand thus provided is then collected on a moving collection support to form a strand accumulation of highly uniform structure. While the strand is being collected, the accumulation is heated to prevent solidification of the thermoplastic binder present in the suspension.

Finally, after the collection has been completed, a compaction pressure is applied to the heated tow accumulation to fuse the accumulation into a uniform, dense prepreg mat. Compaction is accomplished without the removal of any thermoplastic suspension from the accumulation, typically by means of a cooled compaction roller. The resulting product is a prepreg mat exhibiting excellent structural homogeneity which is particularly well suited for conversion to a ceramic matrix composite article by known consolidation methods.

The invention further includes apparatus for the fabrication of a preform for a ceramic composite such as above described. The apparatus first comprises moveable substrate means for continuously collecting a prepreg strand to form a collection of the strand. As previously noted, the prepreg strand comprises a fiber reinforcement material infiltrated or coated with a suspension of powdered ceramic matrix material in a thermoplastic binder. The moveable substrate means should be capable of operating in such a manner that it can gather the strand onto the substrate to provide a strand accumulation characterized by completely uniform strand spacing, i.e., without skips or unwanted strand doubling, where this is desired.

Preferably, the apparatus will also include preheating means for preheating the prepreg strand being collected, heating being accomplished prior to contact between the strand and the substrate means or strand previously accumulated thereon. The preheating means are adapted to heat the strand at least to a temperature at which softening of the thermoplastic binder in the prepreg tow is effected.

The apparatus further comprises heating means for heating the surface of the moveable collection substrate and prepreg strand accumulated thereon. Again the heating means selected are effective to heat the accumulated strand material at least to a temperature sufficient to maintain the thermoplastic binder present therein in a softened condition.

Finally, the apparatus includes cooled pressure application means for applying consolidation pressure to the collected prepreg strand after it has accumulated on the collection substrate. Means such as a cooled pressure roller are moveably mounted adjacent the substrate means, the mounting being such that the roller can be moved into contact with the strand accumulation to apply consolidation pressure thereto. This pressure is sufficient to consolidate the strand accumulation into a homogeneous prepreg mat, effecting a beneficial redistribution of fibers, matrix and binder in the prepreg material. The roller or other means should be maintained at a temperature below the softening point of the thermoplastic binder, to avoid unwanted removal of binder and matrix material from the accumulated tow which adversely affects mat homogeneity.

Apparatus such as described produces a prepreg mat for ceramic composite manufacture wherein the distribution of fiber reinforcement material is extremely homogeneous. In addition, because of the way in which uniform fiber distribution is achieved, a low incidence of fiber breakage and thus high strength in the dense composite preform and in ceramic matrix composites produced therefrom are realized.

BRIEF DESCRIPTION OF THE DRAWINGS

The invention may be further understood by reference to the drawings, wherein.

DETAILED DESCRIPTION

Figure 1:
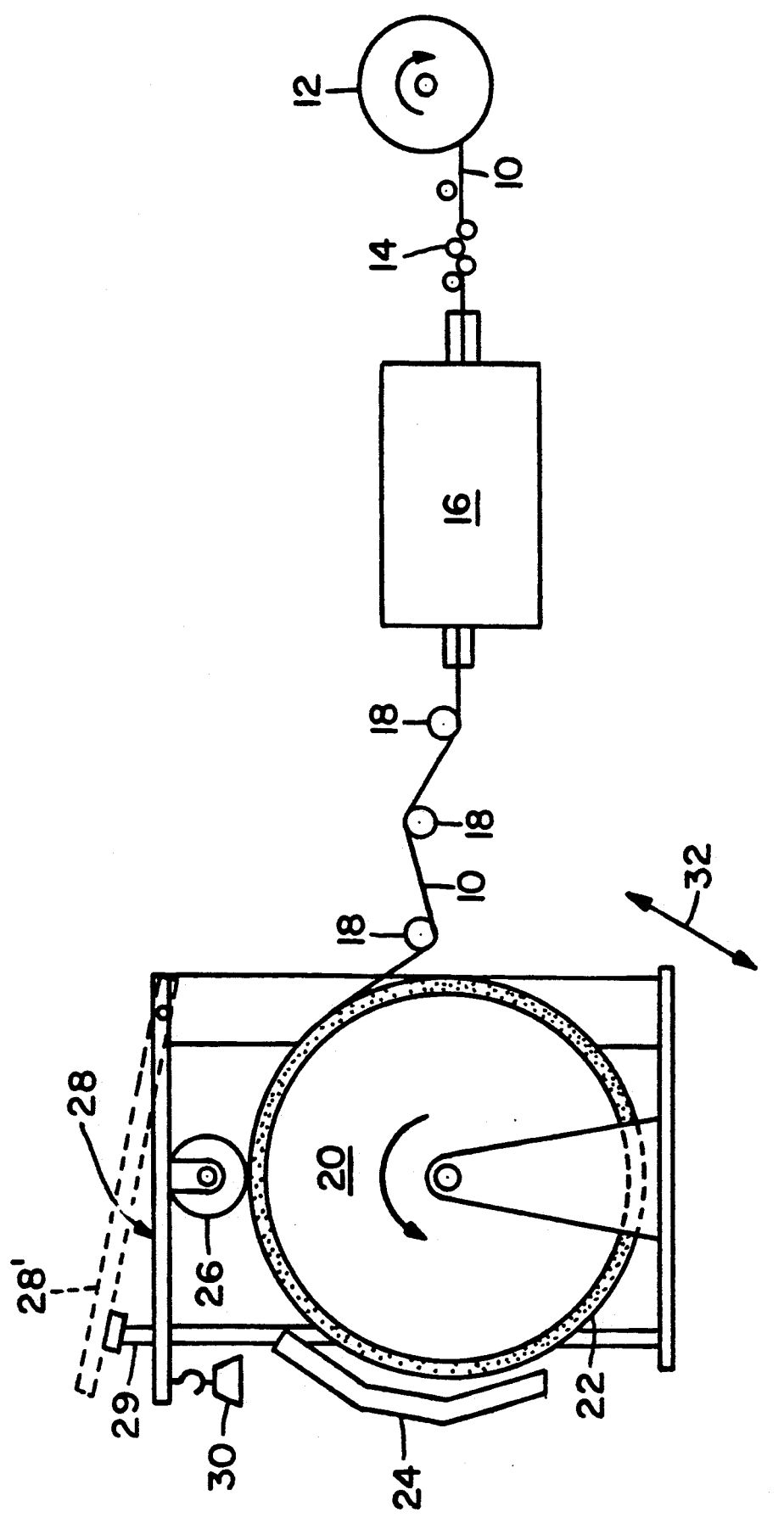
FIG. 1 is a schematic elevational view in cross-section of apparatus for producing a prepreg mat in accordance with the invention.

As will be evident from the following description, the invention is not limited in its application to any particular ceramic matrix material. Any of the various ceramic materials employed for the manufacture of ceramic composites in the prior art, which are capable of being provided in powdered form, may be used. These include powdered glasses, such as powdered aluminosilicate glasses or powdered borosilicate glasses, as well as powdered aluminosilicate glasses which are thermally crystallizable to yield refractory glass-ceramic matrices, including β-spodumene, anorthite, cordierite, or other glass-ceramics. Conventional crystalline ceramics such as alumina, zirconia, silicon carbide, silicon nitride, or the like may also be used.

Likewise, there is no restriction as to the particular reinforcing fibers which will be used; any of a variety of fibers having known utility for ceramic matrix reinforcement, including without limitation fibers of carbon, silicon carbide, glass, silicon nitride, alumina, mullite or similar materials, may be used. The only requirement is that the fibers be available as long continuous fibers or fiber tows which can be treated in accordance with the process of the invention to provide fiber coated or impregnated with the selected matrix material. The preferred materials are fiber tows, most preferably silicon carbide or oxycarbide fiber tows, and the following description refers principally to such tows although other forms of fiber may alternatively be used.

The use of binders having good heat-softening characteristics is critical to the success of the invention, both to obtain good fusion of tow prepreg into the preform during the tow collection phase and to aid fiber redistribution and provide a homogeneous product. In principle, a number of different binder formulations can be used, but the preferred formulations are solvent-free thermoplastic binders comprising a mixture of one or more thermoplastic polymers and one or more waxes.

A particularly preferred thermoplastic binder is hereinafter described; other such binders are disclosed in copending, commonly assigned U.S. patent application Ser. No. 07/358,571 filed May 30, 1989 now abandoned R. E. Johnson et al., which is expressly incorporated herein by reference and which may be referred to for a further description of thermoplastic binders.

Illustrative of the preferred thermoplastic binders are binder formulations comprising 10–40% by weight of thermoplastic polymers, e.g., one or more of ultra-high molecular weight polyethylene, acrylic or polyethylene/acrylic copolymers, and styrene tri-block copolymer elastomers. The wax component suitably comprises 35–90% by weight of the binder and includes one or more low-melting fatty acid, fatty glyceride or, preferably, fatty alcohol waxes which are room temperature solids and melt below 80° C.

The production of prepreg fiber tow or strand for use as a starting material in the method of the invention follows conventional procedures for fiber tow impregnation using liquid or liquifiable thermoplastic suspensions of powdered ceramic matrix materials. A selected continuous fiber tow or yarn, optionally pretreated to remove sizing or other foreign substances therefrom, is transported through a suspension or slurry of the powdered ceramic matrix material in the thermoplastic binder, the suspension being heated to a temperature providing good liquidity. The product of such an immersion treatment is a prepreg strand wherein good penetration of the ceramic matrix suspension into the tow cross-section is achieved.

A particular advantage of the invention is that prepreg tow to be used for the manufacture of dense preforms can be screened prior to actual use, since there is no requirement that the impregnated strand be formed into the final prepreg shape before it is allowed to cool and the binder solidify. Instead, the prepreg tow made as described may be cooled and inspected for characteristics such as strength, matrix loading, fiber distribution or the like before further processing.

As the need for prepreg mat arises, prepreg tow will be selected for incorporation in the mat based on one or more of the above characteristics. It will then be preheated to a temperature above the softening point of the thermoplastic binder, most preferably by drawing through preheating means such as a tube furnace, and then collected on the substrate as previously described. This practice permits improved control over the quality of the prepreg strand used to shape the final preform.

A preferred form of apparatus for continuously forming prepreg tow into a dense, homogenous prepreg mat is schematically shown, in elevational view, in FIG. 1 of the drawing. As shown in FIG. 1, a continuous prepreg fiber tow 10, comprising fiber tow impregnated with a ceramic matrix powder in a thermoplastic binder, is fed from supply reel 12 at room temperature through tensioning spools and into preheating tube furnace 16. The temperature in furnace 16 is maintained above the softening temperature of the thermoplastic binder on the tow to soften the matrix suspension present thereon.

The tow exiting furnace 16 is next fed over grooved guide rollers 18 formed, for example, of fluorocarbon polymer, and is guided onto revolving collection drum 20. Drum 20, which may be formed of cast aluminum or other material, is typically covered with a release paper (not shown), and supports an accumulation of prepreg tow shown as accumulation 22. The accumulated tow 22 is maintained at an elevated temperature by radiant heat source 24, which source radiates heat toward the accumulated tow and maintains the thermoplastic binder therein in a softened condition. This heating is continued until collection of the softened tow is completed.

Tow accumulation 22 is most preferably of substantial width. The preferred method for defining the width of the tow accumulation is by translating collection drum 20, together with pressure roller 26, swing assembly arm 28, and arm support bar 29, smoothly forward and/or backward in a direction transverse to the collection path of prepreg tow 10. This translation is shown by double arrow 32 in FIG. 1.

An important requirement for prepreg homogeneity is the attainment of a smooth translation of the collection drum with the associated pressure roller. Experimental operation of apparatus such as shown, but with uneven traverse rates, produced "drum skipping" or uneven windings, resulting in non-uniform structure in the resulting prepreg mat. On the other hand, even traverse rates produce uniform windings and high quality prepregs.

After collection of the softened tow has been completed, swing arm assembly 28 supporting pressure roller 26 is released from a raised position temporarily held by arm support bar 29 (this raised position being partially shown in phantom as arm 28'), and the assembly is lowered into the compaction position shown in order to apply compression force to the accumulated tow 22. Pressure roller 26, which should be pre-cooled by air (or by other means), may if desired be composed of or coated with fluorocarbon plastic in order to avoid roller adhesion to the heated thermoplastic binder on the tows. The pressure applied by roller 26 may be adjusted by applying weight 30 to the end of swing arm assembly 28, or by spring or other tensioning means applied to the arm.

It is important that the temperature of compaction roller 26 be maintained sufficiently low that pickup of the binder and matrix material by the compaction roller is entirely avoided. Experiments have shown that, if the roller is permitted to be heated by the accumulated tow to a temperature above the tacking temperature of the binder (about 100° C. for the binders we employ), as for example when compaction is started too soon, then binder pickup and matrix loss from the prepreg can occur. For this reason, our practice is to commence compaction only after the collection of the prepreg tow has been completed, in order that compaction can be completed within a short time interval and without undue roller heating.

Presently, we prefer to utilize a process wherein single-layer windings are compacted to produce the desired mat. However, multilayer windings, produced using a single post-winding compaction step or a compaction step after each winding layer has been collected, may alternatively be employed.

The preparation of a ceramic matrix composite preform in accordance with the invention using apparatus such as described is more fully illustrated by the following detailed Example.

EXAMPLE

A silicon carbide fiber tow is selected for use as a reinforcing fiber material for a ceramic matrix composite. The tow selected is Nicalon® NLM-202 silicon carbide fiber tow, commercially available from the Nippon Carbon Company of Tokyo, Japan.

In preparation for the manufacture of a ceramic matrix composite product incorporating this fiber tow, a thermoplastic vehicle suitable for the application of a powdered glass matrix material to the tow is first prepared. This thermoplastic vehicle, which exhibits desirable rapid solidifying behavior, comprises about 60 parts by weight of a fatty alcohol wax, about 20 parts by weight of a styrene-ethylene/butylene-styrene thermoplastic tri-block copolymer, and about 20 parts by weight of a polybutene resin plasticizer.

The wax used in the vehicle is Alfol ™ 1418 DDB fatty alcohol wax blend, comprising a mixture of tetradecanol, hexadecanol, and octadecanol waxes and being commercially available from the Vista Chemical Company of Houston, Texas. The thermoplastic block copolymer used is Kraton ™ G1650 thermoplastic elastomer, commercially available from the Shell Chemical Company of Houston, Texas. The plasticizer is Parapol 950 oil additive, commercially available from Exxon Chemicals of Houston, Texas.

To prepare the vehicle, all components except the block copolymer resin are weighed into a container and heated to 140° C. to melt the components together. The resin is then added to the molten mixture and all components are mixed with heating to about 167° C. until complete intermixing is obtained.

A thermoplastic matrix suspension incorporating this vehicle is next prepared by first dispersing powdered glass in a fugitive carrier liquid. The dispersion comprises 750 ml of toluene and 3.8 gm of a dispersant for each 1000 gm of glass, the dispersant consisting of Hypermer KD3 dispersant from ICI Americas of Wilmington, Del. The glass used is a calcium magnesium aluminosilicate glass which is thermally crystallizable on appropriate heat treatment to yield a glass-ceramic matrix comprising anorthite as the principal crystalline phase. It is provided as a powder having an average particle size, by Coulter TAII analysis, of about 10 microns.

The dispersed glass and carrier are then combined with the thermoplastic vehicle formulation in a proportion which will yield approximately equal parts by weight of glass solids and thermoplastic vehicle in the final thermoplastic suspension. The resulting mixture is then processed in a heated planetary mixer at approximately 140° C. to remove the fugitive carrier and to complete the blending of the glass and thermoplastic vehicle. Substantially complete gelation of this suspension occurs as it is cooled to a temperature of about 100° C.

The blended powdered glass suspension produced as described is applied to the silicon carbide fiber tows by immersion coating of the fibers in conventional fashion. A spool of the selected silicon carbide fiber tow is mounted on a spindle and the tow is drawn therefrom over a pulley and through a tube or burn-out furnace operating at a temperature of about 800° C. The sizing is removed from the silicon carbide fiber tow as it passes through this furnace, the transport rate of the fiber tow through the apparatus being about 60 ft/min.

The de-sized fiber tow exiting the furnace next passes into a heated reservoir of the thermoplastic suspension of matrix powder produced as above described. The reservoir is heated by means of an oil bath heater having a set point temperature of about 200° C., this set point being sufficient to maintain the temperature of the suspension in the reservoir at about 150°-160° C.

After passage through the thermoplastic matrix suspension the fiber tow impregnated with the suspension is drawn through a stripping die positioned at the upper surface of the suspension and having an orifice diameter of approximately 0.040". The die orifice is selected simply to achieve a predetermined loading of matrix suspension on the tow; larger or smaller dies may be substituted or the die may be dispensed with entirely.

After stripping the tow is passed upwardly through a vertical cooling tower to set the thermoplastic suspension, and then down to a take-up reel where it is collected for later use. Due to rapid solidification of the binder, the set rate of the thermoplastic suspension on the tow is sufficiently rapid that essentially no sticking of the impregnated fibers, either to the takeup spool or to adjacent fiber tows, is observed.

The prepreg fiber tow produced as described above is formed into a preconsolidated composite prepreg by a tow collection and fusion procedure. The lead end of a length of the prepreg tow stored on a tow reel is first passed through a tow preheater consisting of a tube furnace, and through a set of grooved tensioning rollers positioned at the furnace output port. The strand is then affixed to a collection substrate consisting of a precision cast aluminum collection drum which has been covered with a layer of release paper. The release paper used is Paper 2-60SF-157 paper, commercially available from Daubert Coated Products Company of Oak Brook, Ill.

The tube furnace is next heated to a temperature of approximately 425° C. to soften the thermoplastic binder on the tow, while a radiant heater directed at the collection drum is actuated to preheat the drum, in order that tow collected thereon will remain soft. The heater consists of three large panels of Nichrome ™ wire heating coils, hinged to conform to the curved surface of the drum and covering about ⅓ of the drum collection surface. Rotation and translation of the drum are then commenced to begin collection of the softened tow onto the drum surface.

The collection drum is translated smoothly past the line of collection of the prepreg tow in a single pass, the translation traversing a distance of about 30 cm. Smooth translation results in a highly uniform distribution of the tow winding over the surface of the drum. This collection step yields a single-layer winding of 30 cm total width.

After collection of the winding has been completed, a compaction pressure is applied to the tow accumulation by lowering onto the winding an air-cooled Teflon ®-polymer-surfaced compaction roller of the same width as the collection drum. The roller has a weight sufficient to achieve a loading of approximately 10 kg on the tow material passing thereunder. Compaction is continued, while continuing to apply heat to the mat, until the compaction roller exhibits signs of impending binder/matrix pickup. It is then immediately raised and the heater is turned off so that the compacted tow accumulation can cool to room temperature.

The preform mat consisting of the compacted tow accumulation is next cut from the drum and flattened to produce a prepreg mat. The thickness of the mat is about 0.05 cm. Smaller prepreg sheets are then cut from the mat, and are stacked to form a dense preform stack about 16 layers in thickness.

Figure 2:
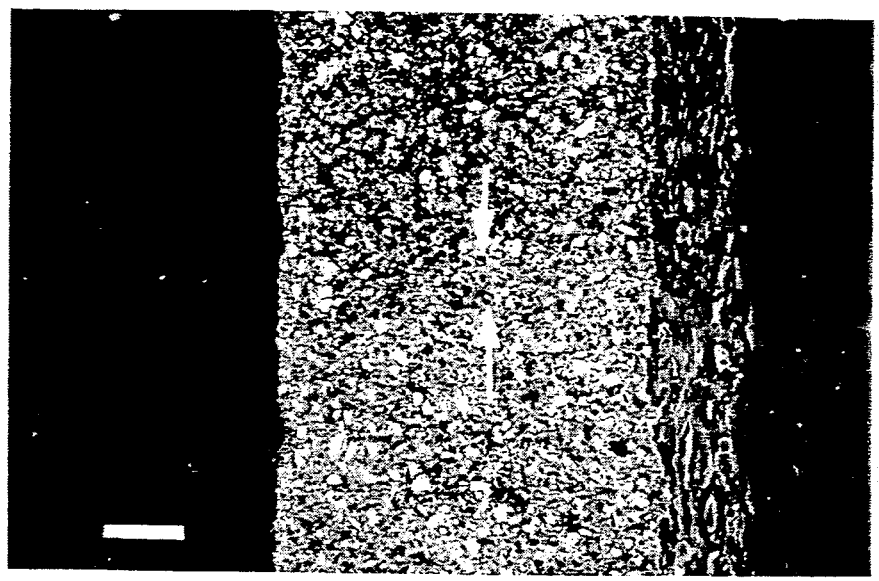
FIG. 2 is a photomicrograph of a cross-section of a prepreg mat produced in accordance with the invention.

Due to the way that tow collection and compaction are carried out in accordance with our method, the preform formed by the above procedure is of very high homogeneity and density. FIG. 2 of the drawing is an electron photomicrograph of a polished cross-section of a small segment of a prepreg mat produced by the winding of heated tow as described, wherein the white bar represents a dimension of 100 microns. The arrows indicate representative fibers in the particulate matrix material, which are relatively evenly spaced in the sample although not well differentiated from the matrix and vehicle in terms of brightness value. Particularly noteworthy in this micrograph is the total absence of voids or concentrations of binder not containing any matrix and fibers. This uniformity of structure, which extends throughout prepreg mats produced as above described, minimizes the need for significant fiber and/or matrix realignment during the subsequent consolidation of the preform.

The preform stack thus provided is fully consolidated by hot pressing in the known manner to provide a ceramic matrix composite plate. Generally, vaporization of the thermoplastic binder from the tow material is first accomplished by heating it to a temperature of about 550° C. in an atmosphere such as air or nitrogen. Then the resulting porous, binder-free composite preform is consolidated by heating to a peak consolidation temperature of about 1300°–1400° C., concurrently with the application of a consolidation pressure of about 1000–2000 psi. These conditions of temperature and pressure are maintained for approximately 15 minutes, following which the consolidated composite is depressurized and cooled, removed from the hot press, and examined.

The product of this process is a ceramic matrix composite plate exhibiting very uniform microstructure and excellent strength and toughness.

Results similar to those described in the working example above are attainable using other combinations of fibers, ceramic matrix materials, and thermoplastic binders. Therefore, while our detailed description refers to specific materials and specific procedures, it will be recognized that those materials and procedures are presented for purposes of illustration only, and are not intended to be limiting. Instead, numerous modifications and variations upon the compositions and processes specifically described herein may be resorted to by those skilled in the art within the scope of the appended claims.

We claim:

1. A method for making a uniform prepreg mat useful for ceramic matrix composite fabrication which comprises the steps of:
    (a) providing a continuous prepreg strand formed of one or more inorganic reinforcing fibers coated or impregnated with a thermoplastic suspension of a ceramic matrix powder in a thermoplastic binder, the strand being provided at a temperature at which the thermoplastic binder is in a softened condition;
    (b) collecting the prepreg strand on a moving collection support in uniform fashion to form a strand accumulation of regular strand spacing while heating the strand accumulation to prevent solidification of the thermoplastic binder therein; and thereafter,
    (c) cooling and applying compaction pressure to the tow accumulation to fuse the accumulation into uniform, dense prepreg mat.

2. A method in accordance with claim 1 wherein the step of providing a continuous prepreg strand comprises preheating a continuous prepreg strand containing a solidified thermoplastic binder, such preheating being to a temperature at least sufficient to soften the binder.

3. A method in accordance with claim 2 wherein the ceramic matrix powder is composed of a ceramic material selected from the group consisting of aluminosilicate glasses, borosilicate glasses, thermally crystallizable aluminosilicate glasses, and crystalline ceramics.

4. A method in accordance with claim 2 wherein the thermoplastic binder has a composition which comprises one or more thermoplastic polymers and one or more waxes.

5. A method in accordance with claim 2 wherein the inorganic reinforcing fiber is a continuous fiber tow.

6. A method in accordance with claim 5 wherein the inorganic fiber tow is comprised of silicon carbide or silicon oxycarbide fibers.

* * * * *